US011556953B2

(12) United States Patent
Bhole et al.

(10) Patent No.: US 11,556,953 B2
(45) Date of Patent: Jan. 17, 2023

(54) METHODS, SYSTEMS, AND MEDIA FOR TIMING PRESENTATION OF CONTENT

(71) Applicant: Google LLC, Mountain View, CA (US)

(72) Inventors: Chetan Pitambar Bhole, San Mateo, CA (US); Tanmay Khirwadkar, San Francisco, CA (US); Deepak Ramamurthi Sivaramapuram Chandrasekaran, San Jose, CA (US); Sanjay Mangla, San Francisco, CA (US)

(73) Assignee: Google LLC, Mountain View, CA (US)

( * ) Notice: Subject to any disclaimer, the term of this patent is extended or adjusted under 35 U.S.C. 154(b) by 311 days.

(21) Appl. No.: 16/814,352

(22) Filed: Mar. 10, 2020

(65) Prior Publication Data
US 2021/0287244 A1 Sep. 16, 2021

(51) Int. Cl.
*G06Q 30/00* (2012.01)
*G06Q 30/02* (2012.01)
(Continued)

(52) U.S. Cl.
CPC ... *G06Q 30/0239* (2013.01); *H04N 21/23424* (2013.01); *G06N 20/00* (2019.01)

(58) Field of Classification Search
CPC .... G06Q 30/0239; G06N 20/00; G06N 7/005; H04N 21/23424; H04N 21/252; H04N 21/812; H04N 21/8456
See application file for complete search history.

(56) References Cited

U.S. PATENT DOCUMENTS 10,332,019 B2 6/2019 Yang et al.
2019/0349619 A1* 11/2019 Hou .................. H04N 21/4722
(Continued)

FOREIGN PATENT DOCUMENTS

CN 107124320 9/2017
WO WO 2019120471 6/2019

OTHER PUBLICATIONS

"Using Viewing Statistics to Control Energy and Traffic Overhead in Mobile Video Streaming". IEEE. 2016. (Year: 2016).*
(Continued)

*Primary Examiner* — Maria V Vanderhorst
(74) *Attorney, Agent, or Firm* — Byrne Poh LLP (57) ABSTRACT

Methods, systems, and media for timing presentation of content are provided. In some embodiments, the method comprises: causing a first video content item to be presented on a user device of a user, wherein the video content item is provided by a video sharing service; identifying a promotion for the video sharing service that is to be presented to the user during a time window; determining a probability that the user will select the promotion if the promotion is presented at a first time point within the time window in connection with the first video content item; determining whether to present the promotion at the first time point based on at least on the probability; in response to determining that the promotion is to be presented at the first time point, causing the promotion to be presented on the user device at the first time point in connection with the first video content item; and, in response to determining that the promotion is not to be presented at the first time point, causing the promotion to be presented on the user device at a second time point in connection with a second video content item, wherein the second time point is within the time window and wherein the second time point is after the first time point.

15 Claims, 5 Drawing Sheets

(51) Int. Cl.
    *H04N 21/234*     (2011.01)
    *G05B 19/418*     (2006.01)
    *G06N 20/00*      (2019.01)

(56)            References Cited

U.S. PATENT DOCUMENTS

2020/0134648 A1*  4/2020  Qi .......................... G06N 7/005
2020/0349611 A1* 11/2020  Publicover ............ H04L 67/306

OTHER PUBLICATIONS

A Combined Approach for Customer Profiling in Video on Demand Services Using Clustering and Association Rule Mining. IEEE. 2020. (Year: 2020).*
"Accurate and early prediction of user lifespan in an online video-on-demand System". IEEE. 2016. (Year: 2016).*

* cited by examiner

METHODS, SYSTEMS, AND MEDIA FOR TIMING PRESENTATION OF CONTENT

TECHNICAL FIELD

The disclosed subject matter relates to methods, systems, and media for timing presentation of content.

BACKGROUND

Users frequently use websites associated with particular services or applications associated with particular services to view media content (e.g., stream or download media content, such as music, television shows, movies, videos, etc.), connect with other users (e.g., via social networking services), perform tasks (e.g., purchase items, edit documents, receive or send messages, etc.). In many cases, a service may want to notify a user of different features available through the service. For example, a service that provides media content may want to notify a user about a premium option through which media content may be downloaded rather than streamed. As another example, a service may want to notify a user about a premium option through which media content may be viewed without advertisements or with fewer advertisements. However, it can be difficult to time presentation of such notifications. For example, in some cases, presenting too many notifications to a user or presenting notifications at particular times may cause a user to stop using the service.

Accordingly, it is desirable to provide new methods, systems, and media for timing presentation of content.

SUMMARY

Methods, systems, and media for timing presentation of content are provided.

In accordance with some embodiments of the disclosed subject matter, a method for timing presentation of content is provided, the method comprising: causing a first video content item to be presented on a user device of a user, wherein the video content item is provided by a video sharing service; identifying a promotion for the video sharing service that is to be presented to the user during a time window; determining a probability that the user will select the promotion if the promotion is presented at a first time point within the time window in connection with the first video content item; determining whether to present the promotion at the first time point based on at least on the probability; in response to determining that the promotion is to be presented at the first time point, causing the promotion to be presented on the user device at the first time point in connection with the first video content item; and, in response to determining that the promotion is not to be presented at the first time point, causing the promotion to be presented on the user device at a second time point in connection with a second video content item, wherein the second time point is within the time window and wherein the second time point is after the first time point.

In some embodiments, determining whether to present the promotion at the first time point is based on an average probability of the user selecting the promotion in connection with any video content item in a group of video content items.

In some embodiments, the second time point is identified based on a determination that a probability that the user will select the promotion if the promotion is shown at the second time point is greater than the probability that the user will select the promotion if the promotion is shown at the first time point.

In some embodiments, determining whether to present the promotion at the first time point comprises determining whether the probability exceeds a predetermined threshold. In some embodiments, the predetermined threshold is determined based on a probability of the user using the video sharing service within the time window. In some embodiments, the predetermined threshold is a first value when the probability is within a first range, and the predetermined threshold is a second value that is higher than the first value when the probability is within a second range that is higher than the first range.

In accordance with some embodiments of the disclosed subject matter, a system for timing presentation of content is provided, the system comprising a hardware processor that is configured to: cause a first video content item to be presented on a user device of a user, wherein the video content item is provided by a video sharing service; identify a promotion for the video sharing service that is to be presented to the user during a time window; determine a probability that the user will select the promotion if the promotion is presented at a first time point within the time window in connection with the first video content item; determine whether to present the promotion at the first time point based on at least on the probability; in response to determining that the promotion is to be presented at the first time point, cause the promotion to be presented on the user device at the first time point in connection with the first video content item; and, in response to determining that the promotion is not to be presented at the first time point, cause the promotion to be presented on the user device at a second time point in connection with a second video content item, wherein the second time point is within the time window and wherein the second time point is after the first time point.

In accordance with some embodiments of the disclosed subject matter, a non-transitory computer-readable medium containing computer executable instructions that, when executed by a processor, cause the processor to perform a method for timing presentation of content is provided, the method comprising: causing a first video content item to be presented on a user device of a user, wherein the video content item is provided by a video sharing service; identifying a promotion for the video sharing service that is to be presented to the user during a time window; determining a probability that the user will select the promotion if the promotion is presented at a first time point within the time window in connection with the first video content item; determining whether to present the promotion at the first time point based on at least on the probability; in response to determining that the promotion is to be presented at the first time point, causing the promotion to be presented on the user device at the first time point in connection with the first video content item; and, in response to determining that the promotion is not to be presented at the first time point, causing the promotion to be presented on the user device at a second time point in connection with a second video content item, wherein the second time point is within the time window and wherein the second time point is after the first time point.

In accordance with some embodiments of the disclosed subject matter, a system for timing presentation of content is provided, the system comprising: means for causing a first video content item to be presented on a user device of a user, wherein the video content item is provided by a video sharing service; means for identifying a promotion for the video sharing service that is to be presented to the user during a time window; means for determining a probability that the user will select the promotion if the promotion is presented at a first time point within the time window in connection with the first video content item; means for determining whether to present the promotion at the first time point based on at least on the probability; means for causing the promotion to be presented on the user device at the first time point in connection with the first video content item in response to determining that the promotion is to be presented at the first time point; and means for causing the promotion to be presented on the user device at a second time point in connection with a second video content item in response to determining that the promotion is not to be presented at the first time point, wherein the second time point is within the time window and wherein the second time point is after the first time point.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for timing presentation of content are provided.

In some embodiments, the mechanisms described herein can determine whether a promotion associated with a service is to be shown to a user at a current time, or whether presentation of the promotion is to be delayed to a later time. In some embodiments, a service can include any suitable type of service used by a user, such as a media content streaming service, a social networking service, a content storage and/or sharing service, and/or any other suitable type of service. In some embodiments, the promotion can be any suitable promotion associated with the service. For example, in some embodiments, the promotion can include an advertisement of a subscription, product, or feature provided by the service. As a more particular example, in some embodiments, in an instance in which the service is a media content streaming service, the promotion can include a subscription which, when purchased by the user, allows the user to stream media content with fewer or no advertisements. As another more particular example, in some embodiments, in an instance in which the service is a media content streaming service, the promotion can include an indication of an application provided by the service for playback of a particular type of media content provided by the service, such as music.

In some embodiments, the mechanisms described herein can determine whether a promotion associated with a service is to be shown to a user at a current time in any suitable manner. For example, in some embodiments, the mechanisms can calculate a probability that the user will select or click on the promotion if the promotion is shown at the current time, and can determine whether the promotion is to be shown at the current time based on the calculated probability. As a more particular example, in some embodiments, the mechanisms can determine whether the promotion is to be shown at the current time based on any suitable criteria, such as whether the probability that the user will select the promotion at the current time exceeds a predetermined threshold. In some such embodiments, the mechanisms can determine the predetermined threshold based on any suitable information, such as a predicted likelihood that the user will use the service (e.g., visit a page on which the promotion is to be presented, and/or use the service in any other suitable manner) within a particular time window (e.g., a time window during which the promotion is to be presented, and/or any other suitable time window), as described below in more detail in connection with FIG. 1.

In some embodiments, the mechanisms can determine whether to show a promotion at a current time, where the current time is in a particular time window (e.g., within the next hour, within the next week, within the next month). In some embodiments, in response to determining that the promotion is not to be shown at the current time within the time window, the mechanisms can determine a different time within the time window at which the promotion is to be shown to the user. In some embodiments, the different time can be determined in any suitable manner and based on any suitable information. For example, in some embodiments, the mechanisms can predict a probability that the user will select the promotion at different times within the time window and can identify a time with the maximum probability. As another example, in some embodiments, the mechanisms can cause the promotion to be presented to the user in response to determining that the time window is about to expire and the promotion has not yet been presented to the user.

Figure 1:
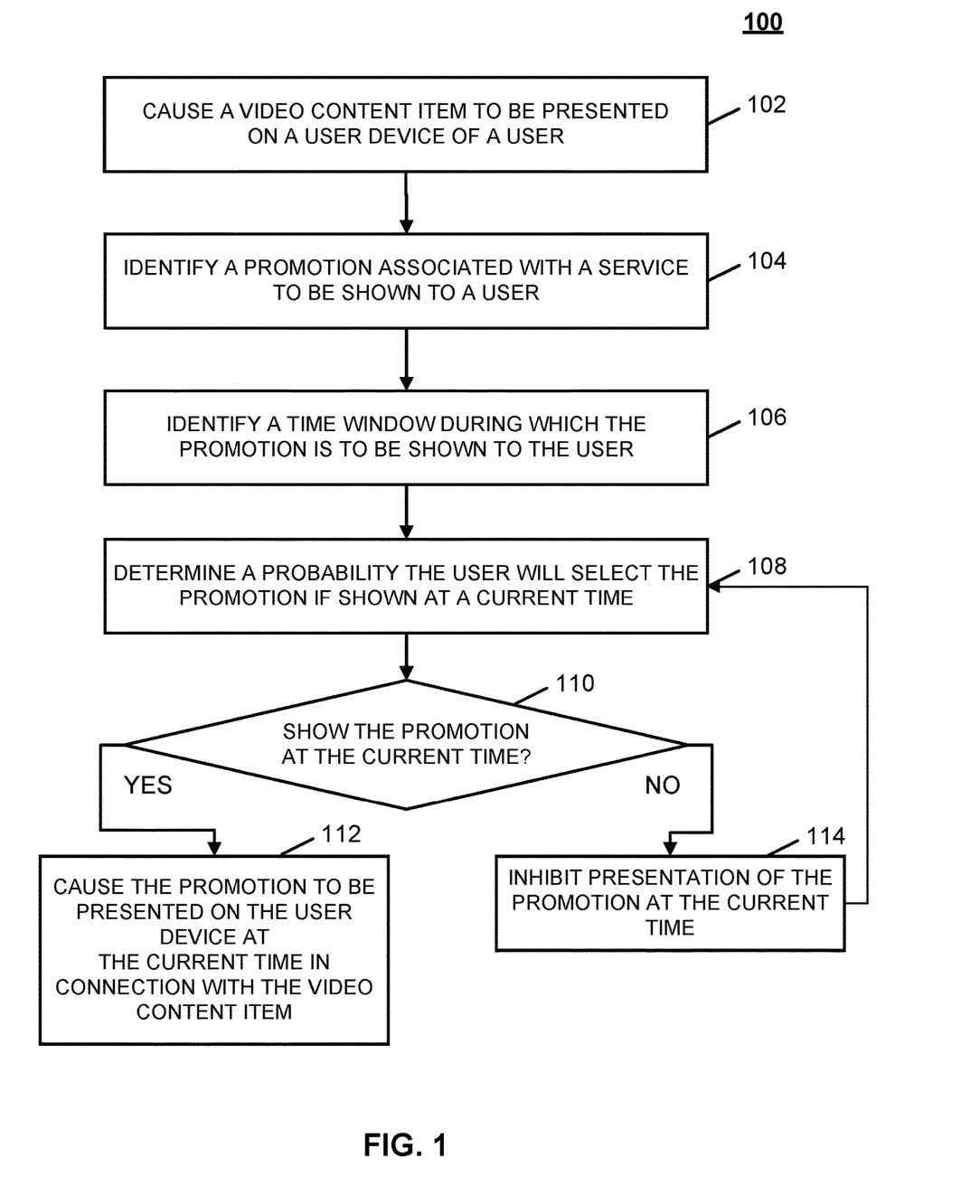
FIG. 1 shows an illustrative example of a process for presenting or inhibiting presentation of a content item at a current time is in accordance with some embodiments of the disclosed subject matter.

Turning to FIG. 1, an illustrative example 100 of a process for presenting a promotion at a current time or inhibiting presentation of the promotion at the current time is shown in accordance with some embodiments of the disclosed subject matter. In some embodiments, blocks of process 100 can be executed on any suitable device. For example, in some embodiments, blocks of process 100 can be executed by a server associated with a particular service, such as a media content sharing or streaming service, a social networking service, and/or any other suitable service.

At 102 of process 100, the server can cause a video content item to be presented on a user device of a user. In some embodiments, the video content item can be any suitable type of video content item (e.g., a video, a music video, a television show, live-streamed video content, a video content item in a playlist of video content items, and/or any other suitable type of video content item). In some embodiments, the user device can be any suitable type of user device (e.g., a mobile phone, a tablet computer, a virtual assistant device, a television, a smart television, a streaming media device connected to a display device, a wearable computer, and/or any other suitable type of user device). In some embodiments, the server can cause the video content item to be presented on the user device in any suitable manner. For example, in some embodiments, in an instance in which the video content item is streamed from the server, the server can transmit video data and audio data that corresponds to the video content item. In some embodiments, the server can begin causing the video content item on the user device in response to a request from the user device.

At 104 of process 100, the server can identify a promotion to be shown to a user. In some embodiments, the promotion can be associated with a particular service currently being accessed by the user. For example, in some embodiments, the promotion can be associated with a media content sharing service or a social networking service that is currently being accessed by the user. Note that, in some embodiments, the service can be accessed by the user on a user device of the user in any suitable manner, such as via a website associated with the service, via an application associated with the service that is executing on the user device, and/or in any other suitable manner.

In some embodiments, the promotion can include any suitable content. For example, in some embodiments, the promotion can include an indication of an available feature associated with the service. For example, in some embodiments, the promotion can indicate that a paid feature associated with the service is available for purchase or subscription (e.g., a feature that allows a user to view media content with no or fewer advertisements, a feature that allows a user to download media content to the user device for offline viewing, and/or any other suitable feature). As another example, in some embodiments, the promotion can include any suitable selectable user interface controls, such as a push button that, in response to being selected, causes a page to be presented that presents more information related to a feature corresponding to the promotion, a push button that, in response to being selected, dismisses the promotion, and/or any other suitable user interface controls.

In some embodiments, the server can identify the promotion in any suitable manner. For example, in some embodiments, the server can identify a promotion that indicates a feature available in connection with the service that the user has not yet purchased or activated. For example, in an instance in which the promotion indicates a feature that allows media content to be downloaded directly to a user device, the server can determine whether the user has purchased or subscribed to the feature. Continuing with this example, in some embodiments, in response to determining that the user has not yet purchased or activated a particular feature, the server can identify a promotion corresponding to the feature. As another example, in some embodiments, the server can identify a promotion relating to a relatively new feature (e.g., released within the previous week, released within the previous month, and/or any other suitable relatively new feature) available in connection with the service.

Note that, in some embodiments, the user can be performing any suitable tasks or actions in connection with the service. For example, in an instance in which the service is a media content sharing service or a social networking service, the user can be browsing pages associated with different content creators, viewing media content items (e.g., streaming media content items, selecting media content items for download to the user device, and/or viewing media content items in any other suitable manner), and/or performing any other suitable actions. In some embodiments, the user can be performing any suitable tasks or actions via an application associated with the service that is executing on the user device. Additionally or alternatively, in some embodiments, the user can be performing any suitable tasks or actions via a website associated with the service that is presented via a browser application executing on the user device.

At 106 of process 100, the server can identify a time window during which the promotion is to be shown to the user. In some embodiments, the time window can include any suitable time range from a current time to a future time. In some embodiments, the time window can have any suitable duration (e.g., one day, one week, two weeks, one month, and/or any other suitable duration). In some embodiments, the server can identify the time window in any suitable manner. For example, in some embodiments, the time window can be of a fixed duration (e.g., one day, one week, two weeks, one month, and/or any other suitable duration) for all promotions associated with the service. As another example, in some embodiments, the server can identify the time window based on the promotion and/or based on a feature corresponding to the promotion. As a more particular example, in some embodiments, in an instance in which the promotion is valid for a particular duration of time (e.g., a discount or sale that is valid or available for a particular duration of time), the server can identify the time window as a time period equal to the duration of time the promotion is valid or as a time period shorter than the duration of time the promotion is valid.

At 108 of process 100, the server can determine a probability that the user will select or click on the promotion if shown at a current time. Note that the probability that a particular user will select a particular promotion that is shown in connection with a particular video content item is referred to herein as $q(u, v, p)$, where q is the probability, u includes user features associated with the particular user (e.g., an identifier of the user, and/or any other suitable user features, as described below in more detail in connection with FIG. 2), v includes features associated with the particular video content item (e.g., an identifier of the video content item, a topic of the video content item, and/or any other suitable features, as described below in more detail in connection with FIG. 2), and p includes features associated with the particular promotion (e.g., an identifier of the promotion, and/or any other suitable features, as described below in more detail in connection with FIG. 2).

It should be noted that, in some embodiments, the probability can include co-relations between these features. For example, how a user (feature) interacted with a promotion (feature) in the past can be captured by a cross-product of the features. In another example, how a user interacted with a promotion in the past can be captured automatically by a machine learning model or any other suitable model.

In some embodiments, process 100 can determine the probability in any suitable manner. For example, in some embodiments, process 100 can predict the probability using a model trained using data that indicates whether users selected previously presented promotions. Example techniques for training a model that predicts a probability of a particular user selecting a particular promotion at a current time are shown in and described below in connection with blocks 202 and 204 of FIG. 2.

At 110 of process 100, the server can determine whether to show the promotion at the current time. In some embodiments, the server can determine whether to show the promotion at the current time using any suitable technique or combination of techniques.

For example, in some embodiments, the server can determine whether the probability that the user will select the promotion at the current time exceeds a predetermined threshold (e.g., greater than 0.5, greater than 0.7, and/or greater than any other suitable threshold). In some such embodiments, the predetermined threshold can be determined based on any suitable information. For example, in some embodiments, the predetermined threshold can be a fixed threshold that is used for all users of the service. Alternatively, in some embodiments, the predetermined threshold can be determined based on any suitable factors associated with the user. For example, in some embodiments, the predetermined threshold can be determined based on a probability that the user will use the service again (e.g., a probability that the user will open an application associated with the service on the user device again, a probability that the user will visit the website associated with the service again, and/or use the service in any other suitable manner). As a more particular example, in some embodiments, the server can determine the predetermined threshold such that the predetermined threshold is relatively lower in instances in which the probability that the user will use the service again is relatively low, and, conversely, in which the predetermined threshold is relatively higher in instances in which the probability that the user will use the service again is relatively high. As a specific example, in an instance in which the server determines that the probability that the user will use the service again is relatively low (e.g., 0.2, 0.3, and/or any other suitable relatively low probability) and/or within a relatively low range (e.g., between 0.2 and 0.3, and/or any other suitable range), the server can determine that the predetermined threshold used to determine whether to show the promotion at the current time is to be correspondingly low (e.g., 0.3, 0.4, and/or any other suitable correspondingly low threshold). Conversely, in an instance in which the server determines that the probability that the user will use the service again is relatively high (e.g., 0.8, 0.9, and/or any other suitable relatively high probability) or within a particular relatively high range (e.g., between 0.8 and 0.9, and/or any other suitable range), the server can determine that the predetermined threshold used to determine whether to show the promotion at the current time is to be correspondingly high (e.g., 0.7, 0.8, and/or any other suitable correspondingly high threshold). Note that, in some embodiments, the server can use any suitable technique(s) to determine a probability that the user will use the service again, as shown in and described below in connection with FIG. 3.

As another example, in some embodiments, the server can determine whether the promotion is to be shown based on any suitable combination of the probability that the user will select the promotion at the current time, an average probability of the user selecting a promotion at any time, and/or a probability that the user will use the service associated with the promotion again. In some embodiments, the server can calculate an average probability of the user selecting a promotion at any time in any suitable manner, such as using the technique(s) shown in and described below in connection with blocks 206-210 of FIG. 2. Note that the average probability of the user u selecting a promotion p at any time is referred to herein as $\bar{q}(u, p)$ and the probability that the user will use the service again is referred to herein as $\bar{\alpha}(u)$. In some embodiments, the server can determine whether the promotion is to be shown by combining $q(u, v, p)$, $\bar{q}(u, p)$, and/or $\bar{\alpha}(u)$ in any suitable manner. For example, in some embodiments, the server can determine that the promotion is to be shown if:

$$\frac{q(u, v, p)}{\bar{q}(u, p)} > \bar{\alpha}(u).$$

Conversely, in some embodiments, the server can determine that the promotion is not to be shown if:

$$\frac{q(u, v, p)}{\bar{q}(u, p)} < \bar{\alpha}(u).$$

As another example, in some embodiments, the server can determine whether the promotion is to be shown at the current time based on a probability of the user selecting the promotion at one or more future times. As a more particular example, in some embodiments, the server can calculate probabilities of the user selecting the promotion if shown at different time points within a group of time points spanning the time window. Continuing with this example, in some embodiments, the server can determine that the promotion is not to be shown at the current time if there is a future time of the different time points within the time window with a higher probability of selection of the promotion than the probability corresponding to the current time. In some such embodiments, the server can determine that the promotion is not to be shown at the current time. Additionally, in some embodiments, the server can determine that the promotion is to be shown at a particular future time, such as a future time associated with the time point within the group of time points spanning the time window with the highest probability of selection of the promotion. Note that, in some embodiments, the server can determine whether the promotion is to be shown at the current time based on any suitable combination of the probabilities of the user selecting the promotion at the different time points of the group of time points spanning the time window and the probability of the user using the service. For example, in an instance in which the server determines that there is a relatively high probability of the user selecting the promotion at a particular future time point but that there is a relatively low probability of the user using the service within the time window, the server can determine that the promotion is to be shown at the current time.

As yet another example, in some embodiments, the server can determine whether the promotion is to be shown at the current time based on a predicted number of future visits by the user. For example, in some embodiments, the server can calculate the probabilities of the number of future visits to a page on which the promotion is to be presented. In continuing this example, in response to the server determining that less than a particular number of promotions (e.g., less than N promotions) have been presented in a given time window (e.g., time period 7), the server can determine that additional promotions should be postponed if the number of future visits to a page on which the promotion is to be presented (future_num_visits_predicted) is greater than the number of promotions (N promotions) and a threshold value and if the average probability of showing the promotion in the future (e.g., max(future_visit_prob*future click through rate)) is greater than the current click through rate.

Alternatively, in this example, the server can determine that additional promotions should be presented if the number of future visits to a page on which the promotion is to be presented (future_num_visits_predicted) is less than the number of promotions (N promotions) and a threshold value. It should be noted that, in this example, the server can determine to show the promotion to the user irrespective of the current or future click through rates as the user is unlikely to visit the page a sufficient number of times.

It should be noted that, as described above, the predetermined threshold can be determined based on any suitable information. For example, in some embodiments, the predetermined threshold can be a fixed threshold that is used for all users of the service. Alternatively, in some embodiments, the predetermined threshold can be determined based on any suitable factors associated with the user. For example, in some embodiments, the predetermined threshold can be determined based on a probability that the user will use the service again (e.g., a probability that the user will open an application associated with the service on the user device again, a probability that the user will visit the website associated with the service again, and/or use the service in any other suitable manner). As a more particular example, in some embodiments, the server can determine the predetermined threshold such that the predetermined threshold is relatively lower in instances in which the probability that the user will use the service again is relatively low, and, conversely, in which the predetermined threshold is relatively higher in instances in which the probability that the user will use the service again is relatively high. As a specific example, in an instance in which the server determines that the probability that the user will use the service again is relatively low (e.g., 0.2, 0.3, and/or any other suitable relatively low probability) and/or within a relatively low range (e.g., between 0.2 and 0.3, and/or any other suitable range), the server can determine that the predetermined threshold used to determine whether to show the promotion at the current time is to be correspondingly low (e.g., 0.3, 0.4, and/or any other suitable correspondingly low threshold). Conversely, in an instance in which the server determines that the probability that the user will use the service again is relatively high (e.g., 0.8, 0.9, and/or any other suitable relatively high probability) or within a particular relatively high range (e.g., between 0.8 and 0.9, and/or any other suitable range), the server can determine that the predetermined threshold used to determine whether to show the promotion at the current time is to be correspondingly high (e.g., 0.7, 0.8, and/or any other suitable correspondingly high threshold).

It also should be noted that, in some embodiments, future values, such as the predicted number of future visits and the future click through rate can begin as a single point estimate that captures the maximum possible future client through rate or future visit probability that can be seen until the end of a current time window.

In some embodiments, the server can determine a future click through rate by using the maximum click through rate prediction of buckets in each of the remaining time slots until the end of the current time window. Similarly, the server can determine a future visit probability by computing the probabilities that the user has visited historically in different time slots and selecting the maximum probability for the remaining time in the current time window.

It should be noted that any suitable features can be used for determining these future values, such as the predicted number of future visits for a user, the future click through rate in the remaining time window, and/or the future visit probability in the remaining time window, such as historical visits on specific times and days, watch times of users, visit velocity (e.g., change of visits over different time windows), watch time velocity (e.g., change of watch time over different time windows), visit acceleration (e.g., how fast the user changes their visit behavior), watch time acceleration (e.g., how fast the user changes their watch time behavior), current time of day, remaining time left in the window, end of interval time, other suitable user features, etc.

Referring back to FIG. 1, if, at 110 of process 100, the server determines that the promotion is to be presented at the current time ("yes" at 110), at 112 of process 100, the server can cause the promotion to be presented on the user device at the current time. In some embodiments, the promotion can be presented in connection with the video content item in any suitable manner. For example, in some embodiments, the promotion can be presented as an overlay on the video content item. As another example, in some embodiments, the promotion can be presented within a pop-up window that is presented in response to determining that presentation of the video content item on the user device has finished. As yet another example, in some embodiments, the promotion can be presented as an advertisement inserted into presentation of the video content item.

In some embodiments, the server can cause the promotion to be presented on the user device using any suitable technique(s). For example, in some embodiments, the server can transmit instructions to the user device that instruct the user device to cause the promotion to be presented at any suitable time point (e.g., at a current time, in response to determining that presentation of the video content item has finished, during a next advertisement slot during the video content item, and/or at any other suitable time point). In some such embodiments, the instructions can include any suitable content, such as instructions to generate any suitable user interface controls (e.g., a push button to dismiss the promotion, a push button that causes the user device to navigate to a page to purchase an item or service associated with the promotion, and/or any other suitable controls), any suitable text to be presented in connection with the promotion, any suitable images or icons to be presented in connection with the promotion, and/or any other suitable content.

If, at 110 of process 100, the server determines that the promotion is not to be presented at the current time ("no" at 110), at 114 of process 100, the server can inhibit presentation of the promotion at the current time. In some embodiments, the server can inhibit presentation of the promotion at the current time in any suitable manner. For example, in some embodiments, the server can set any suitable flag(s) that indicate that the promotion has not yet been presented on the user device.

In some embodiments, the server can then loop back to 108 of process 100 and can determine, at an updated time point within the time window, the probability that the user will select the promotion if shown at the updated time point. In some embodiments, by looping through blocks 108 to 112 or 114, the server can cause the promotion to be presented at a time point within the time window based on the probability that the user will select the promotion at the presented time point. Note that, in some embodiments, in an instance in which the server determines that the promotion is not to be shown at a current time at 110 and in which the time window is ending, process 100 can determine that the promotion is to be shown regardless of the probability that the user will select the promotion. That is, in some embodiments, the server can cause the promotion to be presented within the time window at an ending portion of the time window if there was no time at which the server determined the promotion was to be presented based on the probability of the user selecting the promotion.

Note that, in some embodiments, in an instance in which the promotion is presented at a time other than the current time, the promotion can be presented in connection with a second video content item that is different than the video content item described above in connection with block 102. For example, in some embodiments, the second video content item can be a different video content that the user has searched for or selected. As another example, in some embodiments, the second video content item can be a video content item in a playlist of video content items that begins being played back automatically on the user device after a preceding video content item in the playlist of video content items.

Additionally, note that, in some embodiments, in an instance in which, as described above in connection with block 110, the server identified a particular time point at which the promotion is to be presented (e.g., a time point with the highest probability of selection of the promotion in a group of time points spanning the time window), the server can, at block 114, wait until the identified time point has arrived, and, in response to determining that the identified time point has arrived, cause the promotion to be presented.

Figure 2:
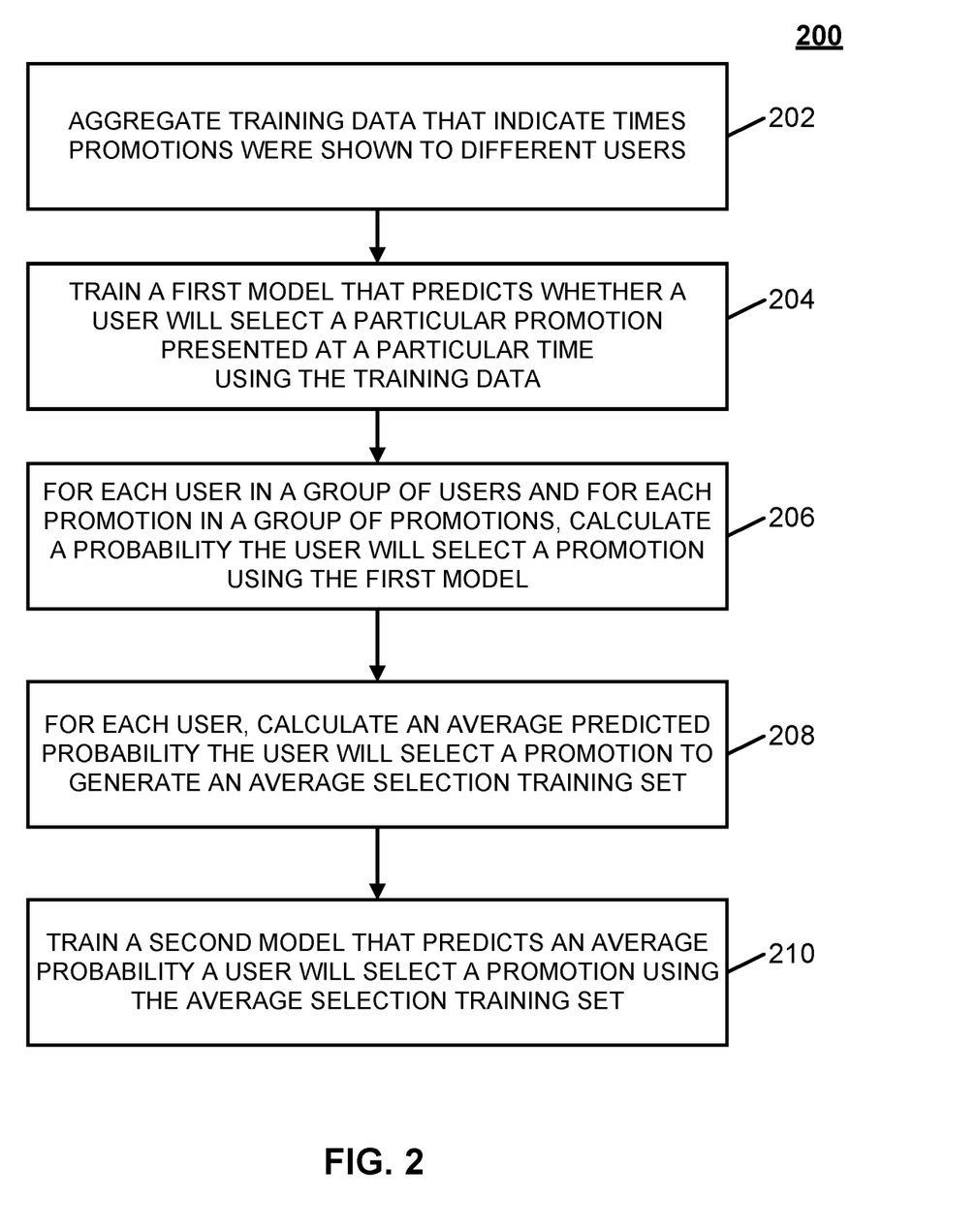
FIG. 2 shows an illustrative example of a process for calculating probabilities that a user will select a promotion in accordance with some embodiments of the disclosed subject matter.

Turning to FIG. 2, an example 200 of a process for calculating probabilities of a user selecting or clicking on a promotion are shown in accordance with some embodiments of the disclosed subject matter. In some embodiments, blocks of process 200 can be executed on any suitable device, such as a server that causes promotions associated with a service to be presented on a user device, as shown in and described above in connection with FIG. 1.

At 202 of process 200, the server can aggregate training data that indicate times promotions were shown to different users. In some embodiments, the training data can include any suitable number (e.g., one hundred, one thousand, ten thousand, one million, and/or any other suitable number) of training samples. In some embodiments, each training sample can be in the form $(x_i, y_i)$, where $x_i$ indicates any suitable user features and promotion features associated with an $i^{th}$ shown promotion, and where $y_i$ indicates whether or not the user selected the promotion. Note that, in some embodiments, $y_i$ can be a binary value, for example, such that 0 indicates that the promotion was not selected and such that 1 indicates that the promotion was selected.

In some embodiments, $x_i$ can be in the form of $(u_i, v_i, p_i)$, where $u_i$ indicates features corresponding to a user who was presented the $i^{th}$ promotion, $v_i$ indicates features of a video associated with presentation of the $i^{th}$ promotion, and $p_i$ indicates features associated with the $i^{th}$ promotion. In some embodiments, user features (that is, information included in $u_i$) can include any suitable information associated with a user presented with the $i^{th}$ promotion. For example, in some embodiments, the user features can include information about the user, such as an identifier of the user, demographic information associated with the user, geographic information associated with the user (e.g., a country the user lives in, a city or town the user lives in, and/or any other suitable geographic information), a language associated with content the user views, genres or topics of content the user is interested in, information indicating media devices the user has and/or uses (e.g., whether the user has and/or uses a particular virtual assistant device, whether the user has and/or uses a smart television, whether the user has and/or uses a streaming media device associated with a television, and/or any other suitable device information), information indicating services the user has previously purchased or subscribed to, and/or any other suitable user information.

As another example, in some embodiments, the user features can include information associated with previously viewed video content items, such as identifiers of previously viewed video content items over any suitable time period, devices on which the user previously viewed video content items, and/or any other suitable information. Note that, in some embodiments, information that indicates a previously viewed video content item can indicate any suitable information about the video content item, such as timestamps of the video content item corresponding to a viewed portion of the video content item, how the user began watching the video content item (e.g., whether the user selected the video content item from a home screen of the service, whether the user searched for the video content item, whether the user selected a link to the video content item from an external page or service, whether the video content item was a next video content item in a playlist of video content items, and/or any other suitable information), whether the user is subscribed to a channel associated with the video content item, a connection speed with which the video content item was streamed from the server, information indicating a view mode of a video player window in which the video content item was presented (e.g., a resolution of the video content item, whether auto-play was enabled or not, whether the video content item was viewed in full-screen, and/or any other suitable viewing information), and/or any other suitable video content item information.

As yet another example, in some embodiments, the user features can include previous activities of the user, such as whether the users has submitted comments on one or more video content items, channels the user has subscribed to, video content items the user has added to a queue of video content, video content items the user has endorsed or shared, whether the user has installed and/or uses particular applications (e.g., particular applications for streaming music, particular applications for viewing video content, applications associated with particular social networking services, applications associated with particular payment services, and/or any other suitable application information), a number of times a user has made a purchase using any suitable online payment service on the device the user is currently using, a duration of elapsed time since a last time a user made a payment on the device the user is currently using, and/or any other suitable activity information.

In some embodiments, information included in the video features $v_i$ can include any suitable information about a video content item associated with presentation of the $i^{th}$ promotion. For example, in some embodiments, the video features can include an identifier of the video content item, keywords associated with the video content item, a name of a creator of the video content item, whether the video content item is monetizable, a number of advertisements inserted in the video content item, a list of impressions associated with advertisements inserted in the video content item (e.g., a number of impressions, timestamps of impressions, and/or any other suitable advertisement impression information), a total number of views of the video content item, a popularity of the video content item, a number of views of the video content item within a predetermined duration of time (e.g., within the past week, within the past month, and/or any other suitable duration of time), a number of endorsements of the video content item by viewers of the video content item, a content rating of the video content item (e.g., indicating that the video content item is suitable for viewers of all ages, indicating that the video content item is suitable for viewers within a predetermined age range, and/or any other suitable content rating information), and/or any other suitable video content item information.

In some embodiments, information included in the promotion features $p_i$ can include any suitable information about the $i^{th}$ promotion. For example, in some embodiments, the promotion features can include an identifier of the promotion, a type of product associated with the promotion (e.g., a particular subscription or level of membership corresponding to the promotion, a particular application corresponding to the promotion, and/or any other suitable product type), a budget associated with the promotion (e.g., a number of times the promotion is to be shown over a predetermined duration of time), a time slot associated with a video content item at which the promotion is to be inserted, an average click through rate associated with the promotion, and/or any other suitable information associated with the promotion.

In some embodiments, the server can aggregate the training data in any suitable manner. For example, in some embodiments, the server can query any suitable database that stores viewing logs that indicate video content items presented to different users, promotions presented to different users, user actions in connection with presented promotions, and/or any other suitable information included in the training data.

At 204 of process 200, the server can train a first model that predicts whether a user will select a particular promotion presented at a particular time. In some embodiments, the server can train the first model in any suitable manner. For example, in some embodiments, the server can train the model using the aggregated training data to predict, for a user $u_i$ presented with a particular promotion $p_i$ in connection with a particular video content item $v_i$, a user response $y_i$ that indicates a prediction of whether or not the user will select the promotion $p_i$. In some embodiments, the first model can be a model that generates a probability associated with an assigned class $y_i$. For example, in an instance in which the first model generates a prediction (e.g., $y_i=0$, $y_i=1$, and/or any other suitable classification prediction), the first model can additionally generate a probability that indicates a probability that the user will select or not select the promotion. Note that the generated probability is referred to herein as $q_i$.

In some embodiments, the first model can correspond to any suitable type of model or algorithm, such as a classification algorithm (e.g., a Support Vector Machine (SVM), a logistic regression, a boosted tree, naïve Bayes, a neural network, and/or any other suitable type of classification algorithm). Note that, in some embodiments, any suitable parameters can be used to train the first model, such as any suitable learning rate, any suitable stopping criteria for iterations of the first model, and/or any other suitable parameters.

At 206 of process 200, the server can, for each user in a group of users and for a group of promotions, calculate a probability that the user will select each promotion in the group of promotions using the trained first model. In some embodiments, at block 206, the server can iterate through a group of viewings of video content items by different users, where $(u_i, v_i)$ indicates a user $u_i$ viewing a particular video content item $v_i$, and can calculate a predicted probability $q_j$ of the user selecting a particular promotion $p_j$ when presented in connection when video $v_i$. Note that, in some embodiments, the server can calculate predicted probabilities for one user $u_i$ viewing many different video content items (e.g., video content items $v_i$, $v_x$, $v_y$, etc.), and, similarly, can calculate predicted probabilities for different users (e.g., users $u_i$, $u_x$, $u_y$, etc.) viewing the same video content items $v_i$. In some embodiments, the server can, for each $(u_i, v_i)$ pair, iterate through a group of promotions $j=1$ m and can calculate a predicted probability $q_j$ of the user selecting promotion $p_j$ for each of the promotions in the group.

In some embodiments, the server can calculate the probability of a user $u_i$ selecting a promotion $p_j$ when presented in connection with a video $v_i$ in any suitable manner. For example, in some embodiments, the server can construct an input that includes user features associated with the user video features associated with $v_i$, and promotion features corresponding to $p_j$ that correspond to the input features used by the trained first model, and can use the trained first model to generate an output $q_j$ that indicates a probability of the user selecting the promotion. For example, in an instance in which user features used by the trained first model include a user identifier and a type of device used by the user, $u_i$ can be (user identifier, user device type). As another example, in an instance in which video features used by the trained first model include a video identifier and a topic, $v_i$ can be (video identifier, video topic). As yet another example, in instance in which promotion features used by the trained first model include a promotion identifier, $p_i$ can be (promotion identifier).

At 208 of process 200, the server can, for each user in the group of users, calculate an average predicted probability that the user will select a promotion. That is, at 208, the server can calculate an average predicted probability that the user will select any promotion presented in connection with any video content item. In some embodiments, the server can calculate the average predicted probability that the user will select a promotion in any suitable manner. For example, in some embodiments, the server can iterate through the predicted probabilities for the promotions $j=1 \ldots m$ for a particular user u in the group of users, and can average the predicted probabilities $q_j$ for each promotion to generate an average probability $\bar{q}$ for the user u. In some embodiments, at block 208, the server can generate tuples for each user in the group of users (u, p, $\bar{q}$).

At 210 of process 200, the server can train a second model that predicts an average probability that a particular user will select a promotion. That is, in some embodiments, the second model can be trained to generate, given an input (u, p), an output $\bar{q}$ that indicates that the user u will select the promotion p. Note that, in some embodiments, u and p can indicate any suitable user features associated with the user u and the promotion p, where user features and promotion features are described above in more detail in connection with block 202.

In some embodiments, the server can train the second model in any suitable manner and using any suitable technique(s). For example, in some embodiments, the server can train the second model by constructing training samples (u, p, $\bar{q}$) based on the average probabilities calculated for each user in the group of users at block 208, and the server can train the second model using the constructed training samples. Note that, in some embodiments, the server can construct any suitable number (e.g., one thousand, ten thousand, one million, and/or any other suitable number) of training samples for training the second model. In some embodiments, the second model can be any suitable type of algorithm or model, such as a classification algorithm (e.g., an SVM, a naïve Bayes model, a boosted tree, a logistic regression, and/or any other suitable classification algorithm) that predicts a class for an input (u, p) that corresponds to a prediction of whether or not the user u will select the promotion p. Note that, in instances in which the second model is a classification algorithm, the classification algorithm can be one that generates a probability associated with a predicted class. For example, in some embodiments, the second model can generate a probability that the user u will select the promotion p.

Note that, although process 200 describes techniques for predicting a probability that a user will select a promotion, in some embodiments, the server can calculate any other suitable probabilities using the same or similar techniques shown in and described above in connection with FIG. 2. For example, in some embodiments, the server can calculate a probability that a user will purchase a product or features corresponding to the promotion when shown in connection with a particular video content item (using the techniques described above in connection with blocks 202-204) and/or can calculate an average probability that the user will purchase a product or feature corresponding to any promotion (using the techniques described above in connection with blocks 206-210). As another example, in some embodiments, the server can calculate a probability that a user will dismiss a promotion when shown in connection with a particular video content item (using the techniques described above in connection with blocks 202-204) and/or can calculate an average probability that the user will dismiss any promotion (using the techniques described above in connection with blocks 206-210). In some such embodiments, a probability of a user purchasing a product or feature and/or a probability of a user dismissing a presented promotion can be used to determine whether a promotion is to be shown at a particular time, as shown in and described above in connection with FIG. 1.

Figure 3:
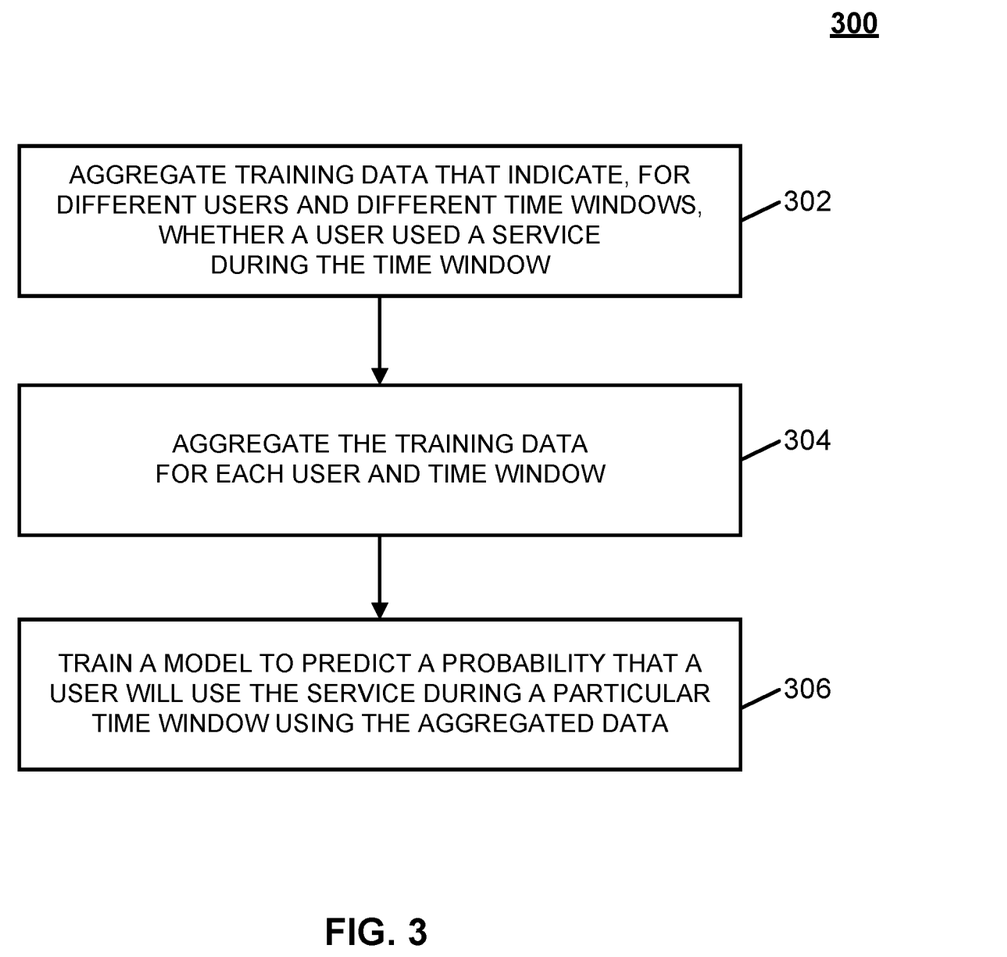
FIG. 3 shows an illustrative example of a process for calculating probabilities that a user

Turning to FIG. 3, an example 300 of a process for predicting probabilities of a user using a service is shown in accordance with some embodiments of the disclosed subject matter. In some embodiments, blocks of process 300 can be executed by any suitable device, such as a server determining whether a promotion for the service is to be shown now or at a later time, as shown in and described above in connection with FIG. 1.

At 302 of process 300, the server can aggregate training data that indicate, for a group of users and a group of time windows, whether a user in the group of users used the service during a time window in the group of time windows. Note that, in some embodiments, using a service can include any suitable type of use, such as visiting a page (e.g., a website, a web page, and/or any other suitable type of page) associated with the service, using an application executing on a user device of the user that is associated with the service, and/or any other suitable type of use.

In some embodiments, the time windows can include any suitable blocks of time, such as particular days of the week (e.g., Mondays, Tuesdays, etc.), particular times of day (e.g., between 9 a.m. and 6 p.m., between midnight and 5 a.m., and/or any other suitable times of day), a combination of days of the week and times of day (e.g., weekdays between 9 a.m. and 5 p.m., weekends between 8 p.m. and midnight, and/or any other suitable combination of days of the week and times of day), and/or any other suitable type of time window. Note that, in some embodiments, a time window can be a block of time that repeats, such as days of the week, times of day, months of the year, and/or any other suitable type of repeated block of time.

In some embodiments, the aggregated training data can be in any suitable format. For example, in an instance in which a time window $t_i$ corresponds to a day of the week, a training samples of the aggregated training day for a user $u_1$ can be: $(u_1, Monday_1, 0)$, indicating that a first Monday, user $u_1$ did not use the service. In some embodiments, the aggregated training data can include, for a particular user, multiple samples corresponding to the same type of time window (e.g., Mondays). For example, continuing with the example given above, training data indicating user $u_1$ use of the service on Mondays can be indicated by a group of training samples such as: $[(u_1, Monday_1, 0); (u_1, Monday_2, 1); (u_1, Monday_3, 0)]$, indicating that the user used the service on the second Monday, and did not use the service on the first and third Mondays. Note that, in the example given above, different Mondays need not be consecutive Mondays. Continuing further with this example, the aggregated training data can further include training samples that indicate whether user $u_1$ used the service on samples of a different time window, such as on Tuesdays. As a more particular example, the aggregated training data can include training samples such as: $[(u_1, Tuesday_1, 1); (u_1, Tuesday_2, 1); (u_1, Monday_3, 0)]$. Note that similar training samples can be constructed for any suitable number of users.

At 304 of process 300, the server can aggregate the training data for each user and for each time window. In some embodiments, the server can aggregate the training data for a particular user and a particular time window in any suitable manner. For example, in some embodiments, the server can calculate a visit probability for the user for the time window by calculating an average of the visits by the user during the different samples of the time window. As a more particular example, continuing with the examples for user $u_1$ given above in connection with block 302, the server can aggregate the visit data for Mondays as: $(u_1, Monday)=0.333$. Continuing further with the example for user $u_1$ given above, the server can aggregate the visit data for Tuesdays as: $(u_1, Tuesday)=0.667$. In some embodiments, the server can aggregate data similarly for each user in a group of users and for each time window, and can generate aggregated visit data such as: $[(u_1, Monday)=0.333; (u_2, Monday)=0.9; (u_1, Tuesday)=0.667; (u_2, Tuesday)=0.7;$ etc.]. Note that although the example given above includes only two users and two time windows (Monday and Tuesday), in some embodiments, the aggregated visit data can include any suitable number (e.g., ten, twenty, one hundred, one thousand, ten thousand, and/or any other suitable number of users) and any suitable number of time windows (e.g., one, two, ten, twenty, and/or any other suitable number).

Note that, similar to what is described above in connection with block 202 of FIG. 2, training data that corresponds to a particular user $u_i$ can include any suitable information indicating any suitable user features, such as a user identifier, user demographics, user interests, and/or any other suitable user features, as described above in connection with block 202.

At 306 of process 300, the server can train a model that predicts a probability that a user will use the service during a particular time window using the aggregated data. That is, in some embodiments, the model can be trained such that, given an input of ($u_i$, time window), the trained model generates an output that indicates a predicted probability that the user $u_i$ will use the service during the time window. For example, given a user $u_i$ and a time window of "Monday," the trained model can generate an output probability that predicts a probability that the user $u_i$ will use the service on a Monday.

In some embodiments, the model can be any suitable type of algorithm or model. For example, in some embodiments, the model can be a classification algorithm (e.g., SVM, naïve Bayes algorithm, logistic regression, a boosted tree, and/or any other suitable type of classification algorithm)

that generates a prediction of a class that corresponds to whether or not the user will use the service during the time window. Note that, in instances in which the model is a classification algorithm, the model can generate a probability that the input is associated with the class predicted by the model. For example, in some embodiments, the model can generate a probability that a particular user corresponding to the input will use the service during the time window.

Note that, in some embodiments, the model trained at block 306 can be used during execution of FIG. 1 in any suitable manner. For example, as described above in connection with block 110 of FIG. 1, in some embodiments, a probability that a user will use a service during a particular time window can be calculated using the model trained at block 306. Continuing with this example, as described above in connection with block 110 of FIG. 1, in some embodiments, the probability that the user will use the service during the time window can be used to set a threshold to determine whether a particular promotion is to be shown at a current time. In another example, the model trained at block 306 can be used to determine a number of future visits by a user. Such a model can be a regression model, such as a linear or polynomial regression model, a support vector machine (SVM) regression model, a neural network, or any other suitable model.

Figure 4:
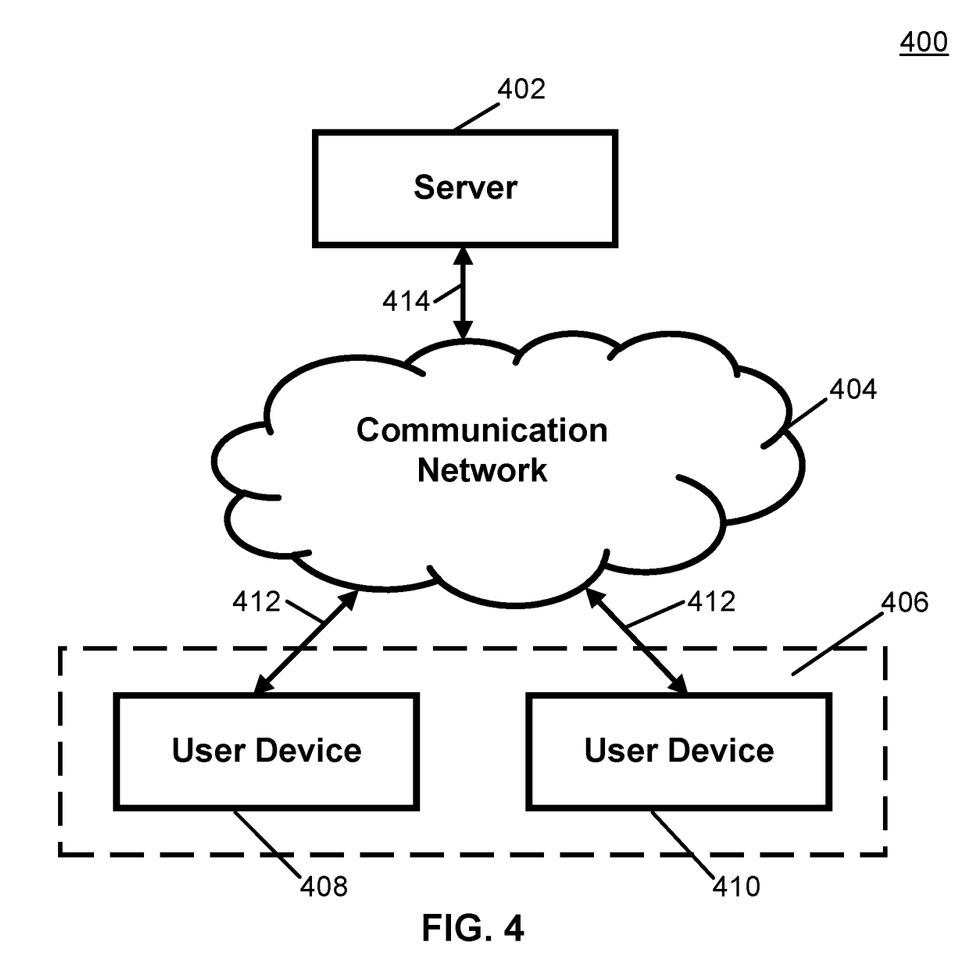
FIG. 4 shows a schematic diagram of an illustrative system suitable for implementation of mechanisms described herein for identifying times to present content in accordance with some embodiments of the disclosed subject matter.

Turning to FIG. 4, a schematic diagram of an illustrative system 400 suitable for implementation of mechanisms described herein for timing presentation of content that can be used in accordance with some embodiments of the disclosed subject matter is shown. As illustrated, system 400 can include a server 402, a communication network 404, and/or one or more user devices 406, such as user devices 408 and 410.

Server 402 can be any suitable server(s) for storing information, data, programs, media content, and/or any other suitable content. In some embodiments, server 402 can perform any suitable function(s). For example, in some embodiments, server 402 can determine whether a promotion (e.g., an advertisement for a particular product or service, and/or any other suitable promotion) is to be shown on a user device at a current time or shown at a later time, as shown in and described above in connection with FIG. 1. As another example, in some embodiments, server 402 can cause a video content item to be presented on a user device in any suitable manner, such as by transmitting data corresponding to the video content item to the user device.

Communication network 404 can be any suitable combination of one or more wired and/or wireless networks in some embodiments. For example, communication network 404 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to server 402. The communications links can be any communications links suitable for communicating data among user devices 406 and server 402 such as network links, dial-up links, wireless links, hard-wired links, any other suitable communications links, or any suitable combination of such links.

User devices 406 can include any one or more user devices suitable for presenting content. In particular, user devices 406 can include any suitable user devices suitable for presenting promotions in connection with pages or user interfaces (e.g., a user interface of an application, a website, and/or any other suitable page or user interface). In some embodiments, user device 406 can include any suitable type of user device, such as mobile phones, tablet computers, wearable computers, laptop computers, desktop computers, smart televisions, media players, game consoles, vehicle information and/or entertainment systems, and/or any other suitable type of user device.

Although server 402 is illustrated as one device, the functions performed by server 402 can be performed using any suitable number of devices in some embodiments. For example, in some embodiments, multiple devices can be used to implement the functions performed by server 402.

Although two user devices 408 and 410 are shown in FIG. 4 to avoid over-complicating the figure, any suitable number of user devices, and/or any suitable types of user devices, can be used in some embodiments.

Server 402 and user devices 406 can be implemented using any suitable hardware in some embodiments. For example, in some embodiments, devices 402 and 406 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 514, an antenna 516, and a bus 518.

Figure 5:
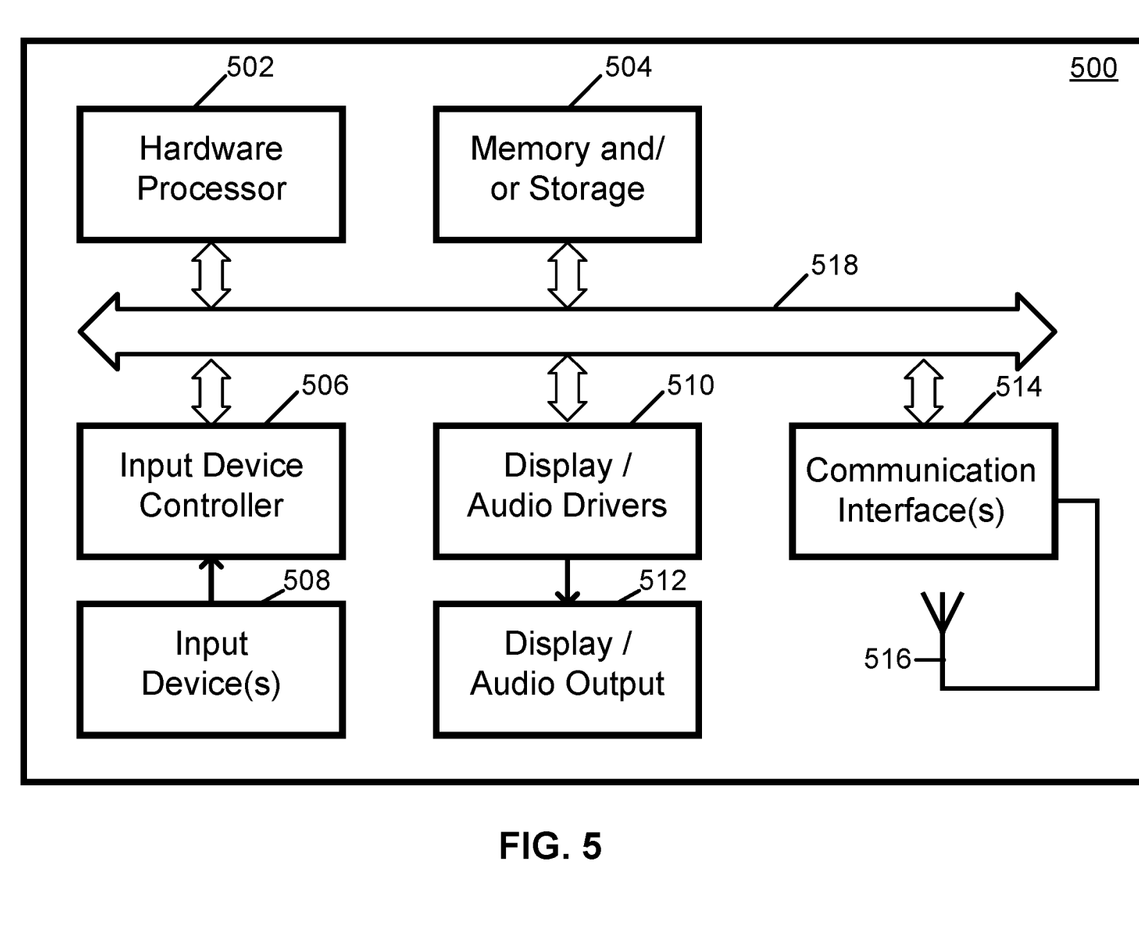
FIG. 5 shows a detailed example of hardware that can be used in a server and/or a user device of FIG. 4 in accordance with some embodiments of the disclosed subject matter.

Hardware processor 502 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 502 can be controlled by a server program stored in memory and/or storage of a server, such as server 402. In some embodiments, hardware processor 502 can be controlled by a computer program stored in memory and/or storage 504 of user device 406.

Memory and/or storage 504 can be any suitable memory and/or storage for storing programs, data, and/or any other suitable information in some embodiments. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some embodiments. For example, input device controller 506 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 510 can be any suitable circuitry for controlling and driving output to one or more display/audio output devices 512 in some embodiments. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks (e.g., computer network 404). For example, interface(s) 514 can include network interface card circuitry, wireless communication circuitry, and/or any other suitable type of communication network circuitry.

Antenna 416 can be any suitable one or more antennas for wirelessly communicating with a communication network (e.g., communication network 404) in some embodiments. In some embodiments, antenna 416 can be omitted.

Bus 518 can be any suitable mechanism for communicating between two or more components 502, 504, 506, 510, and 514 in some embodiments.

Any other suitable components can be included in hardware 400 in accordance with some embodiments.

In some embodiments, at least some of the above described blocks of the processes of FIGS. 1-3 can be executed or performed in any order or sequence not limited to the order and sequence shown in and described in connection with the figures. Also, some of the above blocks of FIGS. 1-3 can be executed or performed substantially simultaneously where appropriate or in parallel to reduce latency and processing times. Additionally or alternatively, some of the above described blocks of the processes of FIGS. 1-3 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for timing presentation of content are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for timing presentation of content, the method comprising:
   causing, using a server that includes a hardware processor, a first video content item to be presented on a user device of a user, wherein the video content item is provided by a video sharing service;
   identifying, using the hardware processor, a promotion for the video sharing service that is to be presented to the user during a time window;
   determining, using the hardware processor, a probability that the user will select the promotion if the promotion is presented at a first time point within the time window in connection with the first video content item by applying user features corresponding to the user, device features corresponding to the user device, and promotion features corresponding to the promotion as inputs into a first trained model that generates an output of the probability that the user will select the promotion if the promotion is presented at the first time point within the time window in connection with the first video content item;
   determining, using the hardware processor, an average predicted probability that the user will select any promotion presented in connection with any video content item by applying at least the user features and the promotions features into a second trained model that generates an output of the average predicted probability that the user will select any promotion presented in connection with any video content item;
   determining, using the hardware processor, whether to present the promotion at the first time point based on at least on the probability determined using the first trained model and the average predicted probability determined using the second trained model;
   in response to determining that the promotion is to be presented at the first time point, causing, using the hardware processor, the promotion to be presented on the user device at the first time point in connection with the first video content item; and
   in response to determining that the promotion is not to be presented at the first time point, causing, using the hardware processor, the promotion to be presented on the user device at a second time point in connection with a second video content item, wherein the second time point is within the time window and wherein the second time point is after the first time point.

2. The method of claim 1, wherein the second time point is identified based on a determination that a probability that the user will select the promotion if the promotion is shown at the second time point is greater than the probability that the user will select the promotion if the promotion is shown at the first time point.

3. The method of claim 1, wherein determining whether to present the promotion at the first time point comprises determining whether the probability exceeds a predetermined threshold.

4. The method of claim 3, wherein the predetermined threshold is determined based on a probability of the user using the video sharing service within the time window.

5. The method of claim 4, wherein the predetermined threshold is a first value when the probability is within a first range, and wherein the predetermined threshold is a second value that is higher than the first value when the probability is within a second range that is higher than the first range.

6. A system for timing presentation of content, the system comprising:
a hardware processor that is configured to:
cause a first video content item to be presented on a user device of a user, wherein the video content item is provided by a video sharing service;
identify a promotion for the video sharing service that is to be presented to the user during a time window;
determine a probability that the user will select the promotion if the promotion is presented at a first time point within the time window in connection with the first video content item by applying user features corresponding to the user, device features corresponding to the user device, and promotion features corresponding to the promotion as inputs into a first trained model that generates an output of the probability that the user will select the promotion if the promotion is presented at the first time point within the time window in connection with the first video content item;
determine an average predicted probability that the user will select any promotion presented in connection with any video content item by applying at least the user features and the promotions features into a second trained model that generates an output of the average predicted probability that the user will select any promotion presented in connection with any video content item;
determine whether to present the promotion at the first time point based on at least on the probability determined using the first trained model and the average predicted probability determined using the second trained model;
in response to determining that the promotion is to be presented at the first time point, cause the promotion to be presented on the user device at the first time point in connection with the first video content item; and
in response to determining that the promotion is not to be presented at the first time point, cause the promotion to be presented on the user device at a second time point in connection with a second video content item, wherein the second time point is within the time window and wherein the second time point is after the first time point.

7. The system of claim 6, wherein the second time point is identified based on a determination that a probability that the user will select the promotion if the promotion is shown at the second time point is greater than the probability that the user will select the promotion if the promotion is shown at the first time point.

8. The system of claim 6, wherein determining whether to present the promotion at the first time point comprises determining whether the probability exceeds a predetermined threshold.

9. The system of claim 8, wherein the predetermined threshold is determined based on a probability of the user using the video sharing service within the time window.

10. The system of claim 9, wherein the predetermined threshold is a first value when the probability is within a first range, and wherein the predetermined threshold is a second value that is higher than the first value when the probability is within a second range that is higher than the first range.

11. A non-transitory computer-readable medium containing computer executable instructions that, when executed by a processor, cause the processor to perform a method for timing presentation of content, the method comprising:
causing, using a server that includes a hardware processor, a first video content item to be presented on a user device of a user, wherein the video content item is provided by a video sharing service;
identifying, using the hardware processor, a promotion for the video sharing service that is to be presented to the user during a time window;
determining, using the hardware processor, a probability that the user will select the promotion if the promotion is presented at a first time point within the time window in connection with the first video content item by applying user features corresponding to the user, device features corresponding to the user device, and promotion features corresponding to the promotion as inputs into a first trained model that generates an output of the probability that the user will select the promotion if the promotion is presented at the first time point within the time window in connection with the first video content item;
determining, using the hardware processor, an average predicted probability that the user will select any promotion presented in connection with any video content item by applying at least the user features and the promotions features into a second trained model that generates an output of the average predicted probability that the user will select any promotion presented in connection with any video content item;
determining, using the hardware processor, whether to present the promotion at the first time point based on at least on the probability determined using the first trained model and the average predicted probability determined using the second trained model;
in response to determining that the promotion is to be presented at the first time point, causing, using the hardware processor, the promotion to be presented on the user device at the first time point in connection with the first video content item; and
in response to determining that the promotion is not to be presented at the first time point, causing, using the hardware processor, the promotion to be presented on the user device at a second time point in connection with a second video content item, wherein the second time point is within the time window and wherein the second time point is after the first time point.

12. The non-transitory computer-readable medium of claim 11, wherein the second time point is identified based on a determination that a probability that the user will select the promotion if the promotion is shown at the second time point is greater than the probability that the user will select the promotion if the promotion is shown at the first time point.

13. The non-transitory computer-readable medium of claim 11, wherein determining whether to present the promotion at the first time point comprises determining whether the probability exceeds a predetermined threshold.

14. The non-transitory computer-readable medium of claim 13, wherein the predetermined threshold is determined based on a probability of the user using the video sharing service within the time window.

15. The non-transitory computer-readable medium of claim 14, wherein the predetermined threshold is a first value when the probability is within a first range, and wherein the predetermined threshold is a second value that is higher than the first value when the probability is within a second range that is higher than the first range.

\* \* \* \* \*